United States Patent

Diehl

[15] 3,678,905
[45] July 25, 1972

[54] INTERNAL COMBUSTION ENGINE DUAL INDUCTION SYSTEM

[72] Inventor: Roy E. Diehl, Livonia, Mich.
[73] Assignee: Ford Motor Company, Dearborn, Mich.
[22] Filed: June 29, 1970
[21] Appl. No.: 50,619

[52] U.S. Cl..................123/52 M, 123/188 M, 123/188 S, 123/52 MV, 123/75 B
[51] Int. Cl..................F02b 75/18, F01l 3/00, F02b 75/02
[58] Field of Search..........123/188 M, 188 S, 52 MV, 52 M, 123/75 B, 127 R

[56] References Cited

UNITED STATES PATENTS

| | | | |
|---|---|---|---|
| 2,440,572 | 4/1948 | Brandenburg et al. | 123/188 S |
| 2,068,311 | 11/1937 | Davis | 123/52 M |
| 2,033,211 | 3/1936 | Tice | 123/52 M X |
| 1,245,511 | 11/1917 | Riotte | 123/75 B |
| 1,490,189 | 4/1924 | Schumacher | 123/188 S |

FOREIGN PATENTS OR APPLICATIONS 338,559   11/1930   Great Britain...................123/75 B Primary Examiner—Wendell E. Burns
Assistant Examiner—A. M. Zupcic
Attorney—John R. Faulkner and Keith L. Zerschling

[57] ABSTRACT

An internal combustion engine having a cylinder head positioned over the end of a combustion chamber with the cylinder head having primary and secondary induction passages positioned therein. An induction valve, including a valve stem and a valve head, is reciprocably mounted within the cylinder head and a tube is preferably press fitted in a bore in the cylinder head. The primary induction passage communicates with the exterior of this tube and the secondary passage communicates with the interior of the tube. This tube extends to a position closely adjacent to, or in engagement with, the head of the induction valve when the valve is in the closed position, thereby providing a good seal between the primary and secondary induction passages when the induction valve is closed.

10 Claims, 5 Drawing Figures

Patented July 25, 1972
3,678,905
3 Sheets-Sheet 1
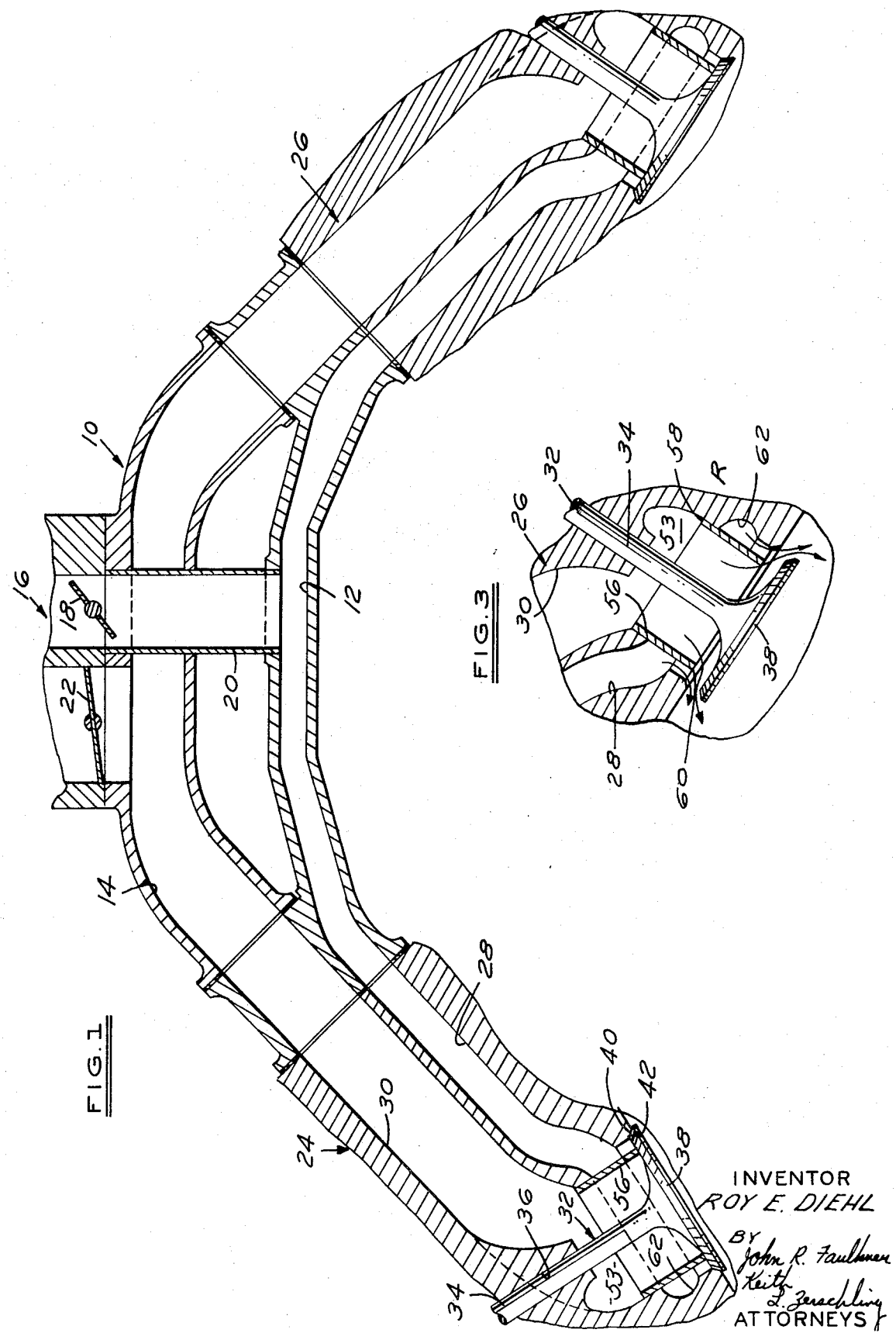
INVENTOR
ROY E. DIEHL
BY
John R. Faulkner
Keith L. Zerschling
ATTORNEYS

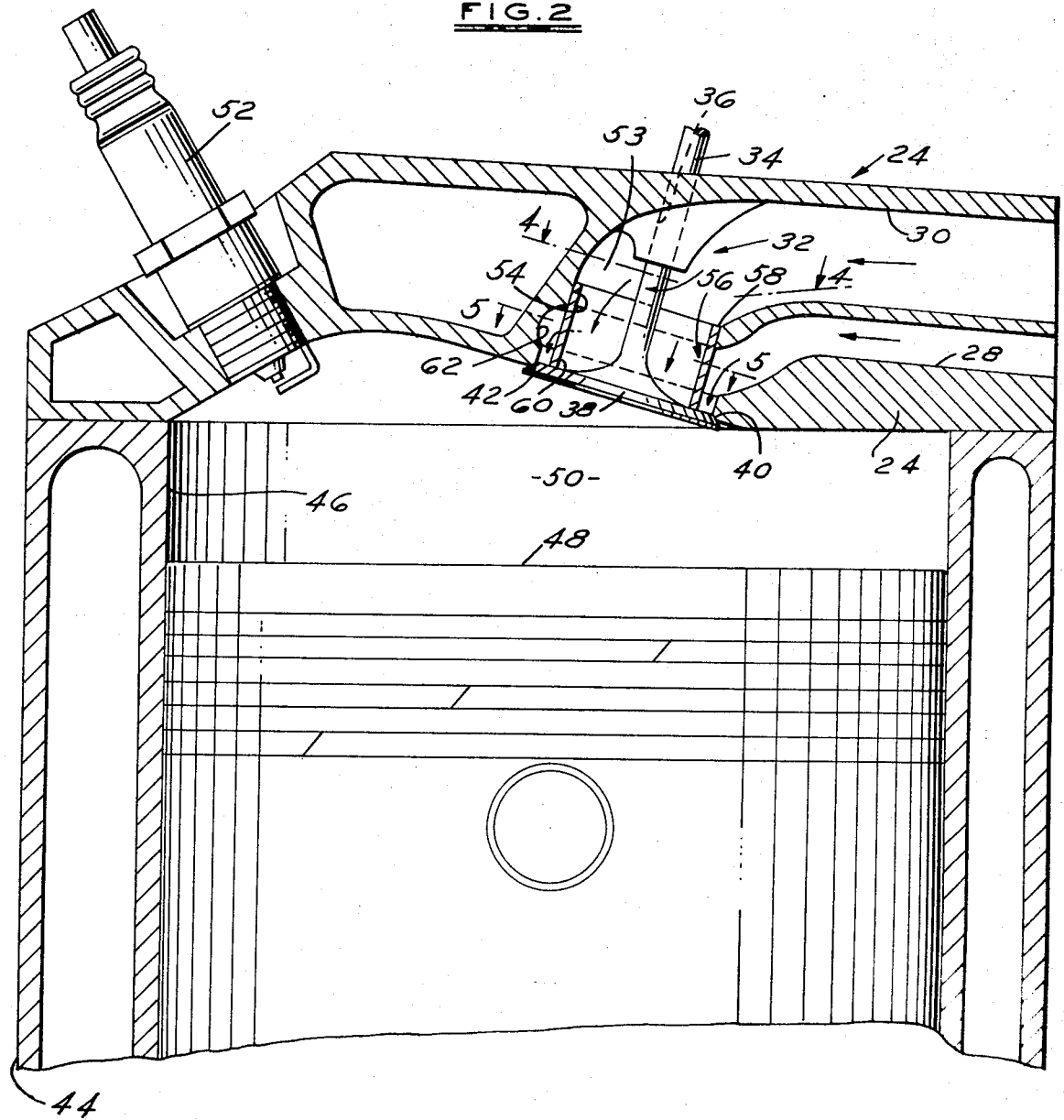

Patented July 25, 1972

INVENTOR
ROY E. DIEHL
BY
John R. Faulkner
Keith L. Zerschling
ATTORNEYS

INTERNAL COMBUSTION ENGINE DUAL INDUCTION SYSTEM

BACKGROUND OF THE INVENTION

This invention relates generally to air-fuel induction systems for internal combustion engines and, more particularly, to an internal combustion engine having primary and secondary induction passages leading to an intake valve of a combustion chamber.

Dual induction systems for internal combustion engines including dual induction intake passages and ports for the combustion chambers of internal combustion engines are known in the art. These dual induction systems include a small primary passage communicating with a carburetor and an intake or induction valve in a combustion chamber and a larger secondary air or air-fuel passage also communicating with the intake or induction valve. In these systems, an air-fuel mixture for engine operation at idle and at normal road loads is supplied from the carburetor of the internal combustion engine to the combustion chambers through the small primary air-fuel passages and a second air-fuel mixture, or excess air, is supplied to the combustion chambers through much larger secondary air passages when the internal combustion engine is operating under very high load conditions, such as those that occur during peak acceleration periods and at wide open throttle.

These dual induction systems have several advantages over the conventional single induction systems currently used in internal combustion engines that employ a single induction passage leading from the carburetor to an intake valve located in a combustion chamber. At idle and normal road loads, the air flow through the small primary induction passages has a velocity sufficient to fully mix the fuel with the air and to supply all of the combustion chambers of the internal combustion engine with substantially the same air-fuel mixtures. This action results in more complete burning of the fuel in each combustion chamber of the internal combustion engine thereby resulting in better engine operation and a reduction in the unburned hydrocarbons and carbon monoxide emitted by the internal combustion engine.

In order to maximize the above mentioned advantages of a dual induction system, it is necessary that the primary air-fuel passage and the secondary air-fuel or air passage be fully separated and sealed from one another to form complete and separate passages when the intake valve is closed. If this is not the case, as is true in many of the prior art devices, the air-fuel mixture flowing through the primary induction passage will feed back through the secondary air-fuel or air passage to the other combustion chambers of the engine thereby reducing the velocity of flow through the primary air-fuel passage and reducing the velocity of the air-fuel mixture in the primary passage. This reduces the magnitude of the advantages brought out above, i.e. it will result in a less even air-fuel mixture for each of the cylinders or combustion chambers and it will reduce smoothness of engine operation, as well as, increasing the amount of unburned hydrocarbons and carbon monoxide emitted from the internal combustion engine.

In other words, for a dual induction passage system to function at top efficiency and at its optimum performance levels, a good, if not air tight, seal is necessary between the primary air-fuel passage and the secondary air-fuel or air passage when the intake or induction valve is closed. The present invention provides a feasible, economical and easily constructed dual induction construction for an internal combustion engine in which such a seal is provided.

SUMMARY OF THE INVENTION

This invention includes a combustion chamber in an internal combustion engine having a piston reciprocably mounted therein. A cylinder head is positioned over one end of the combustion chamber and primary and secondary induction passages are positioned in the cylinder head. As is conventional, the induction valve has a valve stem and a valve head and the valve stem is reciprocably mounted within the cylinder head. The cylinder head has a bore positioned therein which preferably has a diameter slightly less than the diameter of the valve seat that receives the valve head. A tube or cylinder is positioned in this bore, preferably in a press fit relationship, and one end of this tube is positioned closely adjacent to, and preferably in direct contact with, the head of the valve when the induction valve is in a closed position.

The primary induction passage that carries an air-fuel mixture during idle and normal load conditions of the internal combustion engine communicates with the exterior of this tube, preferably with a toroidal shaped passage positioned around the exterior, and the secondary air-fuel or air passage communicates with the interior of the tube.

As a result of the above construction, the primary air-fuel passage and the secondary air-fuel or air passage are completely separated from one another when the induction valve is in a closed position. When the induction valve opens, air-fuel mixture flows around the exterior of the cylinder or tube, preferably through the toroidal shaped passage, to provide a swirling action for the air-fuel mixture and the secondary air-fuel mixture or secondary air pours into the combustion chamber substantially axially of the valve stem and within the swirling action of the air-fuel mixture coming from the primary air-fuel passage. This action provides good mixing of the fuel in the combustion chamber to accomplish complete combustion and burning of the hydrocarbons contained in the fuel.

As stated above, the cylinder or tube is preferably press fitted within the bore surrounding the valve stem. As a result, the end of the tube adjacent the valve head may be positioned in engagement therewith to provide a complete seal between the primary air-fuel passage and the secondary air-fuel or air passage. When the valve face on the valve head and the valve seat wear so that the valve head progresses further into the cylinder head during normal wearing conditions, the head will strike the end of the cylinder or tube and drive it further within the bore. As a result, the clearance between the valve head and the end of the cylinder or tube adjacent to it will be maintained at or close to zero over the whole operating life of the internal combustion engine.

With a good seal provided between the primary air-fuel passage and the secondary air-fuel or air passage, the velocities of the air-fuel mixture in the primary passages can be maintained at a high level. As a result, the air-fuel ratios supplied to each combustion chamber will be substantially the same thereby preventing overly rich mixtures from being supplied to certain combustion chambers and very lean uncombustible mixtures from being supplied to others. This alone will result in the lowering of unburned hydrocarbon emissions. In addition, the air-fuel mixtures supplied to the primary air-fuel passages can be set at high levels, for example, 17 –1 at idle and 20 –1 during part load operating conditions. With these high air-fuel ratios, the hydrocarbons in the fuel will be burned more thoroughly thereby resulting in low unburned hydrocarbon emissions. In addition, with the high ratio of air in the combustion chambers, low levels of carbon monoxide emissions will result. Moreover, the large amount of air supplied to the combustion chambers will reduce the temperatures of combustion thereby resulting in lower emission levels of oxides of nitrogen.

In the preferred embodiment of the invention, the bore in the cylinder head that receives the valve stem, the valve seat that receives the sealing face of the valve head, and the bore that receives the cylinder or tube are all co-axially aligned. As a result, after casting operations of the head are complete, a single milling operation with a milling cutter having a multiple of milling surfaces may be employed to machine the two bores and the valve seat in the cylinder head. The only remaining operation necessary is to press fit the tube or cylinder into the bore in the cylinder head.

An object of the present invention is the provision of a dual induction system for an internal combustion engine which is effective to reduce undesirable gaseous emissions from the internal combustion engine.

Another object of the invention is the provision of a dual induction system providing a complete seal between the primary air-fuel passage and the secondary air-fuel or air passage which is inexpensive, easy to fabricate, and is effective over the complete operating life of the engine.

Other objects and attendant advantages of the present invention will become more readily apparent as the drawings are considered in connection with the specification.

BRIEF DESCRIPTION OF THE DRAWINGS

FIG. 1 is a sectional view through the intake manifold and a portion of the cylinder head of an internal combustion engine employing the present invention;

FIG. 2 is a sectional view, partially in elevation, through a combustion chamber of an internal combustion engine employing the present invention and showing the induction valve in the closed position;

FIG. 3 is a partial section view similar to FIG. 2 and showing the induction valve in the open position;

DESCRIPTION OF THE PREFERRED EMBODIMENT

Figure 4:
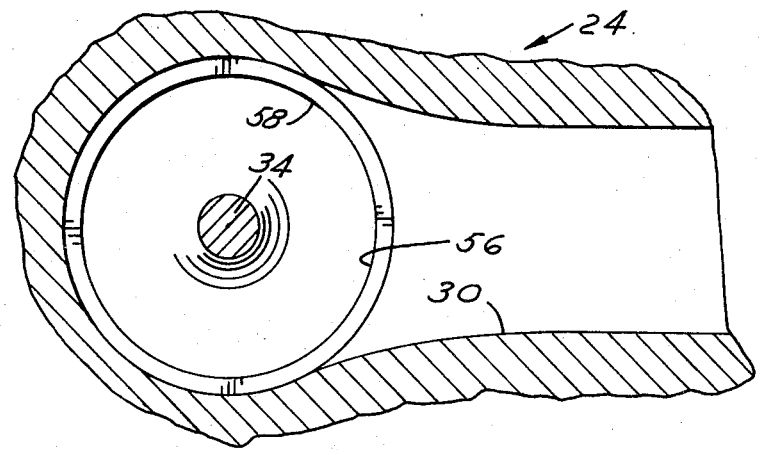
FIG. 4 is a sectional view along the lines 4—4 of FIG. 2.

Referring now to the drawings, in which like reference numerals designate like parts throughout the several view thereof, there is shown in FIG. 1 an induction manifold 10 which has a primary air-fuel passage 12 and a larger, secondary air-fuel or air passage 14 located therein. As shown here in outline form, a carburetor 16 having a throttle valve 18 is employed to feed an air-fuel mixture via tube 20 into the primary air-fuel passage 12. Additionally, a portion of this carburetor, for example, a portion of a conventional four-barrel carburetor having a throttle valve 22, is employed to feed an air-fuel mixture into the secondary air-fuel passage 14. Although the present invention is illustrated with a carburetion system including the throttle valve 22 for feeding an air-fuel mixture into the secondary air-fuel passage 14, the invention also may be employed with a system in which air only is fed into the secondary air passage 14 under the control of throttle valve 22.

The induction manifold 10 is connected to a cylinder head 24 at the left-hand side, as viewed in FIG. 1, and may be similarly connected, in the case of a V-type engine, with a similar cylinder head 26 located at the right-hand side of FIG. 1.

The invention will be described in connection with a single combustion chamber, as shown in FIG. 2 and as partially shown in FIG. 1. It is to be understood, however, that each combustion chamber in the internal combustion engine is identical.

The cylinder head 24 includes a primary air-fuel induction passage 28 that communicates with the primary air-fuel passage 12 located in the induction manifold 10. It also includes a secondary air-fuel or air induction passage 30 that communicates with the secondary air-fuel or air passage 14 located in the induction manifold 10. The primary air-fuel passage 28 and the secondary air-fuel or air passage 30 terminate at an induction valve 32 having a stem 34 reciprocably mounted within a bore 36 in the cylinder head 24 and a valve head 38 having a valve face 40 which is adapted to seat in sealing engagement with a valve seat 42 positioned in the cylinder head 24.

As shown in FIG. 2, the cylinder head 24 is positioned over a cylinder block 44 of the internal combustion engine which has an internal bore or cylinder 46 for receiving a reciprocably mounted piston 48 thereby forming a combustion chamber 50. The cylinder head 24 also has mounted therein a conventional spark plug 52 which is employed to ignite the fuel-air mixture admitted into the combustion chamber 50 when the induction valve 32 is opened.

The cylinder head 24 is provided with an induction chamber 53 having a bore or opening 54 located axially intermediate the bore 36 that receives the valve stem 34 and the valve seat 42. This bore is preferably co-axially positioned with respect to the bore 36 and the valve seat 42 and it receives a tube or cylinder 56. One end 58 of the cylinder or tube 56 terminates in the secondary air-fuel or air passage 30 while the other end 60 terminates closely adjacent to or in engagement with the valve head 38. The cylinder or tube 56 is preferably press fitted within the bore 54 and the end 60 preferably is positioned in engagement with the valve head 30 when the valve 32 is in the closed position, as shown in FIGS. 1 and 2. In other words, there is preferably a zero clearance between the end 60 of the tube or cylinder 56 and the valve head 38 when the valve 32 is closed, as shown in these two figures.

Figure 5:
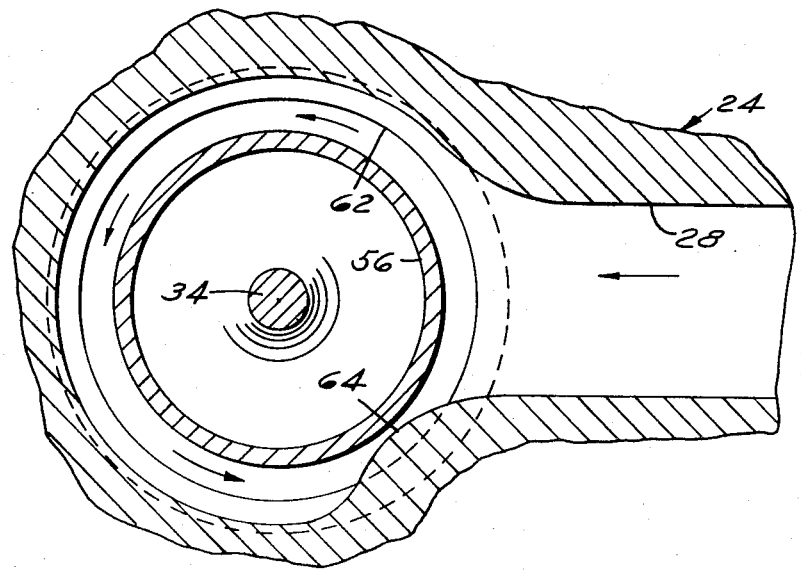
FIG. 5 is a sectional view taken along the lines 5—5 of FIG. 2.

As can be readily appreciated by an inspection of FIGS. 2, 4 and 5, the primary air-fuel passage 28 and the secondary air-fuel or air passage 30 positioned in the cylinder head 24 are separated and sealed from one another when the valve 32 is in the closed position, as shown.

Referring now to FIGS. 2, 4 and 5, it can be seen that the secondary air-fuel or air passage 30 communicates directly with the interior of the tube or cylinder 56 at the end 58 thereof. On the other hand, the primary air-fuel passage 28 communicates with the exterior of the cylinder or tube 56 via a toroidal shaped passage 62 positioned in the cylinder head 24 intermediate the bore 54 and the valve seat 42 in an axial direction, as best shown in FIGS. 1 and 2. This toroidal shaped passage 62 extends around the tube 56 and preferably includes a protuberance 64 positioned therein and forming part of the cylinder head 24. This protuberance 64 serves as a restriction for the air-fuel mixture flowing in the primary air-fuel passage 28 so that the path of the air-fuel mixture in the toroidal passage 62 is in a counterclockwise direction, as viewed in FIG. 5.

As a result of the above structure, when the induction valve 32 opens as shown in FIG. 3, the air-fuel mixture flowing through the primary air-fuel passage 28 and in a swirling path through the toroidal shaped passage 62 is drawn into the combustion chamber 50 in a swirling action. On the other hand, the air-fuel mixture or air flowing through the secondary air-fuel or air passage 30 is drawn into the combustion chamber 50 through the interior of the cylinder or tube 56 and enters the combustion chamber 50 in substantially co-axial relationship to the swirling fuel drawn into the combustion chamber from the primary air-fuel passage 28 and the toroidal shaped passage 62. This provides for a thorough mixing of the air-fuel mixture flowing through the primary air-fuel passage 28 and toroidal passage 62 and the air-fuel mixture or excess air flowing in the secondary air-fuel passage or air passage 30. As a result of this complete mixture, more thorough and complete burning of the fuel is accomplished.

In the construction of the cylinder head of the present invention, the primary air-fuel passages 28 and the secondary air-fuel or air passages 30 are cast together with the chambers 53, as shown in FIGS. 1 and 2, that have the bores 36 and 54 and the valve seat 42 located therein. The bores 36 and 54, as well as, the valve seat 42 may be machined in the cylinder head 24 by means of a single milling cutter having a multiple of milling faces. This is true because in the preferred embodiment of the invention, the bores 36 and 54 and the valve seat 42 are positioned in the cylinder head 24 in co-axially aligned relationship. The cylinder or tube 56 may then be press fitted in the bore 54 and into a position where the end 60 will have very minimal clearance and preferably zero clearance with respect to the valve head 38 of the induction valve 32 when the valve is closed, as shown in FIGS. 1 and 2.

In internal combustion engines, the valve seat 42 positioned in the cylinder head 24, as well as, the valve face 40 positioned on the valve head 38 wear during normal operations so that the valve 32 in the closed position extends farther and farther into the cylinder head 24 or axially upwardly, as viewed in FIGS. 1 and 2. When this occurs, the valve head 38 will strike the end 60 of the tube or cylinder 54 and will drive the cylinder or tube 54 axially upwardly, as viewed in FIGS. 1 and 2, to maintain the zero clearance between the end 60 of the tube 54 and the valve head 30. This may be accomplished since the tube or cylinder 56 is originally press fitted within the bore 54.

The tube or cylinder 56 will operate at zero clearance with respect to the valve head 38 when the induction valve 32 is closed throughout the operating life of the engine and will provide a complete seal between the primary air-fuel passage 28 and the secondary air-fuel or air passage 30 throughout the operating life of the internal combustion engine. As a result of this seal, there will be no feedback of the air-fuel mixture in the primary air-fuel induction passages 28 through the secondary air-fuel or air passages 30 and the secondary air-fuel or air passages 14 in induction manifold 10 from combustion chambers in which induction valves are closed to chambers in which the induction valves are open. The velocity of air-fuel mixture in the primary air-fuel passages 28, therefore, will be maintained at all times at optimum and design levels. Each combustion chamber 50 will receive a thoroughly mixed air-fuel mixture having substantially the same air-fuel ratio during idle and part load conditions. Consequently, it is possible to operate the internal combustion engine with large air-fuel ratios. This large amount of air, together with the complete mixing of the fuel, results in more complete burning of the fuel thereby lowering emission levels of unburned hydrocarbons and carbon monoxide. The large amount of air also reduces the temperatures of combustion thereby lowering the emission levels of oxides of nitrogen.

Thus, the present invention provides a dual induction system for a combustion chamber of an internal combustion engine that is easily and inexpensively constructed, and that provides complete sealing action between the primary air-fuel passage and the secondary air-fuel or air passage of the induction system throughout the operating life of the internal combustion engine. This results in a highly efficient and effective dual induction system that reduces the emission levels of undesirable products of combustion generated in the internal combustion engine.

I claim:

1. An internal combustion engine comprising a combustion chamber, a cylinder head positioned over one end of said chamber, an induction valve mounted in said cylinder head for reciprocable movement therein, said induction valve including a stem and a head having a face, said cylinder head having a bore positioned therein receiving said stem and a valve seat receiving said face, said stem and valve seat being positioned co-axially with respect to each other, said cylinder head having a primary induction passage and a secondary induction passage located therein and a second chamber positioned therein around said stem of said valve, said second chamber including a second bore located co-axially with respect to the bore receiving said stem of said valve and with respect to said valve seat, a cylindrical tube press fitted in said second bore in said second chamber, said secondary induction passage being in communication with one end of said tube, the other end of said tube being in engagement with the head of said valve when said valve face is positioned against said valve seat, the primary induction passage communicating with the exterior of said tube, said cylindrical tube being incrementally displaceable relative to said second bore to accommodate for wear of said valve head face and said valve seat.

2. An internal combustion engine comprising a combustion chamber having a piston reciprocably mounted therein, a cylinder head positioned over one end of said combustion chamber, said cylinder head having a primary induction passage and a secondary induction passage, an induction valve having a valve stem and a valve head, said induction valve being reciprocably mounted in said cylinder head, said cylinder head having a bore positioned therein, a tube press fitted in said bore and extending to a position at one end in engagement with the head of said valve when said valve is in a closed position, said secondary passage communicating with the interior of said tube and said primary induction passage communicating with the exterior of said tube, the opening of said primary induction passage to the combustion chamber being located outside of said tube, the opening of said secondary induction passage to the combustion chamber being located within said tube, said tube being incrementally displaceable relative to said bore to accommodate for wear of engagable portions of said valve head and said cylinder head.

3. The combination of claim 2 in which said cylinder head has a bore positioned therein for receiving said valve stem and a valve seat for receiving said valve head, said bore for receiving said valve stem and said bore receiving said tube and said valve seat being co-axial.

4. The combination of claim 3 in which the bore receiving said tube and said tube are of smaller diameter than the diameter of said valve seat.

5. The combination of claim 3 in which said bore receiving said tube is located axially intermediate said bore in said cylinder head receiving said valve stem and said valve seat, the other end of said tube terminating at the end of said bore adjacent said bore in said cylinder head receiving said valve stem.

6. In an internal combustion engine having structural means defining a combustion chamber,
   a piston reciprocably positioned therein,
   an induction valve reciprocably mounted in said structural means,
   said structural means having a second chamber positioned therein around said induction valve and
   a primary induction passage and
   a secondary induction passage located therein,
   a bore formed in said chamber
   a cylindrical tube press fitted in said bore and extending axially into engagement with said valve head when said valve head is seated on said valve seat, the interior of said tube communicating with said secondary induction passage and the exterior of said tube communicating with the secondary induction passage, said cylindrical tube being incrementally displaceable relative to said bore to accommodate for wear of engagable portions of said induction valve and said second chamber.

7. The combination of claim 6 in which said primary induction passage includes a toroidal shaped passage positioned around the exterior of said cylindrical tube.

8. A dual induction intake port for an internal combustion engine comprising,
   a cylinder head, said cylinder head having a chamber,
   a first induction passage,
   and a second induction passage positioned therein,
   said chamber having a bore positioned in one end thereof, and a valve seat at the other end thereof,
   an induction valve having a valve stem and a valve head, said valve stem positioned in said bore and said valve head adapted to seat against said valve seat when said valve is in a closed position,
   said chamber having a second bore positioned intermediate said first mentioned bore and said valve seat,
   a cylindrical tube press fitted in said second bore and extending from said second bore to a position engagable with said valve head when said induction valve is in a closed position,
   said first induction passage communicating with the interior of said cylindrical tube and said second induction passage communicating with the exterior of said cylindrical tube,
   said cylindrical tube being incrementally displaceable relative to said second bore to accommodate for wear of said valve head and said valve seat.

9. The combination of claim 8 in which said first and second bores, said cylindrical tube and said valve seat are co-axial.

10. The combination of claim 9 in which said cylindrical tube and said second bore have diameters smaller than said valve seat and said valve stem extends through said cylindrical tube in co-axial spaced relationship.

* * * * *